(12) United States Patent
Elfvik (10) Patent No.: US 7,680,587 B2
(45) Date of Patent: Mar. 16, 2010

(54) METHOD AND AN ARRANGEMENT FOR MONITORING THE FUNCTIONING OF A SENSOR OR AN EXHAUST GAS AFTERTREATMENT SYSTEM

(75) Inventor: David Elfvik, Stockholm (SE)

(73) Assignee: Scania CV AB (publ) (SE)

( * ) Notice: Subject to any disclaimer, the term of this patent is extended or adjusted under 35 U.S.C. 154(b) by 62 days.

(21) Appl. No.: 12/097,160

(22) PCT Filed: Dec. 6, 2006

(86) PCT No.: PCT/SE2006/050551

§ 371 (c)(1),
(2), (4) Date: Jul. 15, 2008

(87) PCT Pub. No.: WO2007/073324

PCT Pub. Date: Jun. 28, 2007

(65) Prior Publication Data

US 2008/0295489 A1  Dec. 4, 2008

(30) Foreign Application Priority Data

Dec. 20, 2005 (SE) .................................... 0502822

(51) Int. Cl.
*F01N 11/00* (2006.01)
*F01N 3/20* (2006.01)
(52) U.S. Cl. ..................... 701/114; 701/109; 60/277
(58) Field of Classification Search ............... 701/114, 701/110, 102, 115, 108, 109; 123/690, 688; 60/274, 277, 285, 297
See application file for complete search history.

(56) References Cited

U.S. PATENT DOCUMENTS

| | | | |
|---|---|---|---|
| 5,442,911 A * | 8/1995 | Hirsch ......................... | 60/277 |
| 5,860,277 A | 1/1999 | Schnaibel et al. | |
| 6,053,147 A | 4/2000 | Hemmerlein et al. | |
| 6,269,633 B1 * | 8/2001 | van Nieuwstadt et al. ..... | 60/277 |
| 6,453,663 B1 * | 9/2002 | Orzel et al. .................... | 60/277 |

FOREIGN PATENT DOCUMENTS

| | | |
|---|---|---|
| DE | 4 122 787 A1 | 1/1992 |
| EP | 0 756 071 | 1/1997 |
| WO | WO 2004/109072 A1 | 12/2004 |

OTHER PUBLICATIONS

International Search Report dated Mar. 16, 2007 issued in corresponding PCT Application No. PCT/SE2006/050551.

* cited by examiner

*Primary Examiner*—Hieu T Vo
(74) *Attorney, Agent, or Firm*—Ostrolenk Faber LLP (57) ABSTRACT

A monitoring method and a monitoring arrangement, wherein: (a) first comparison value is established based on information from a sensor as to the measured magnitude of a parameter related to exhaust gases flowing out of an exhaust gas aftertreatment appliance included in an exhaust aftertreatment system; b) a second comparison value corresponding to the first comparison value is established based on a value representing the magnitude of said parameter calculated on the basis of a calculation model; c) a difference value representing the difference between said comparison values is established; d) steps a)-c) are repeated during a certain period of time and a variance value representing the variance of the difference value during this period of time is established; and e) the variance value is compared with a given threshold value for generation of information regarding the functioning of the sensor or the system.

22 Claims, 5 Drawing Sheets

METHOD AND AN ARRANGEMENT FOR MONITORING THE FUNCTIONING OF A SENSOR OR AN EXHAUST GAS AFTERTREATMENT SYSTEM

CROSS REFERENCE TO RELATED APPLICATIONS

The present application is a 35 U.S.C. § 371 national phase conversion of PCT/SE2006/050551, filed Dec. 6, 2006, which claims priority of Swedish Application No. 0502822-0, filed Dec. 20, 2005. The PCT International Application was published in the English language.

BACKGROUND OF THE INVENTION

1. Technical Field

The present invention relates to a method and a monitoring arrangement for monitoring the functioning of a sensor arranged to measure the magnitude of a parameter related to exhaust gases flowing out of an exhaust gas aftertreatment appliance included in an exhaust gas aftertreatment system of a motor vehicle. The invention also relates to a method and a monitoring arrangement for monitoring the functioning of an exhaust gas aftertreatment system of a motor vehicle based on measuring values from a sensor as to the magnitude of a parameter related to exhaust gases flowing out of an exhaust gas aftertreatment appliance included in the exhaust gas aftertreatment system. Furthermore, the invention relates to a computer program comprising computer program code for implementing a method according to the invention, a computer program product comprising a data storage medium readable by an electronic control unit and having said computer program stored thereon, and an electronic control unit.

2. Background Art

In order to fulfil existing and future regulations regarding On-Board Diagnostics of an exhaust gas aftertreatment system of a heavy motor vehicle, it is for instance necessary to control that a catalyst, e.g. in the form of an SCR catalyst (SCR=Selective Catalytic Reduction), included in the system is functioning properly.

A method for monitoring an SCR catalyst is previously known from WO 2004/109072 A1. According to this known method, a temperature value representing the temperature of exhaust gases flowing out of the SCR catalyst is calculated by means of a calculation model and compared with a temperature value measured in the exhaust line downstream of the SCR catalyst. Based on the correspondence between these temperature values, such as for instance the difference between them, it is established whether or not the SCR catalyst and its injection device are functioning in a satisfying and expected manner. Similar methods are also previously known from DE 4 122 787 A1, U.S. Pat. No. 5,860,277 A and EP 0 756 071 A2. A problem associated with this type of monitoring methods relying on a calculation model is that the calculation model normally might give rather correct calculation values but at some operating conditions might give calculation values deviating substantially from the corresponding real values. Thus, incorrect fault indications might be generated based on test samples recorded during the last mentioned operating conditions.

The functioning of an SCR catalyst may also be monitored by means of a $NO_x$ sensor arranged to measure the $NO_x$ content in the exhaust gases downstream of the catalyst. This $NO_x$ sensor may be supplemented by another $NO_x$ sensor arranged to measure the $NO_x$ content in the exhaust gases upstream of the catalyst in order to provide a comparison value. However, a $NO_x$ sensor is an expensive component and one option for dispensing with a $NO_x$ sensor upstream of the catalyst is to use a calculation model for calculating the amount of $NO_x$ produced by the vehicle engine. Furthermore, another calculation model may be used for calculating the expected conversion of $NO_x$ in the catalyst so as to obtain calculated values of the $NO_x$ content in the exhaust gases downstream of the catalyst. These calculated values may then be compared with the measuring values from the $NO_x$ sensor downstream of the catalyst in order to detect possible disorders of the catalyst and the associated equipment. The use of calculation models for calculating the magnitude of the $NO_x$ content in the exhaust gases may however give calculation values deviating substantially from the corresponding real values, which in its turn may result in the generation of incorrect fault indications.

SUMMARY OF THE INVENTION

The object of the present invention is to propose a manner of monitoring an exhaust gas aftertreatment system or a sensor included in such a system, by means of which the above-indicated problems may be alleviated.

This object is achieved by means of a method and a monitoring arrangement according to the invention.

According to the inventive solution:

a) a first comparison value is established based on information from a sensor as to the measured magnitude of a parameter related to exhaust gases flowing out of an exhaust gas aftertreatment appliance, for instance in the form of a catalyst or a filter, included in an exhaust gas aftertreatment system of a motor vehicle;

b) a second comparison value corresponding to the first comparison value is established based on a value representing the magnitude of said parameter calculated on the basis of a calculation model;

c) a difference value representing the difference between said comparison values is established;

d) steps a)-c) are repeated during a certain period of time and a variance value representing the variance of the difference value during this period of time is established; and e) the variance value is compared with a given threshold value for generation of information regarding the functioning of the sensor or the exhaust gas aftertreatment system.

A fault indication is suitably generated if the variance value exceeds the given threshold value so as to thereby indicate a functional disorder of said sensor or exhaust gas aftertreatment system.

By using the above-indicated variance value, it will be possible to evaluate a large number of consecutive test samples in rational and appropriate manner while avoiding that a few abnormal test samples will have a too significant impact on the generated information and the generation of the fault indication. Thus, the generated information and the fault indication are based on several test samples recorded during a suitable period of time and a few abnormal test samples among several normal test samples recorded during this period of time will not themselves cause the generation of a fault indication if the sensor and the associated exhaust gas aftertreatment system are functioning properly.

The invention also relates to a computer program, a computer program product having the features and an electronic control unit having the features according to the invention.

BRIEF DESCRIPTION OF THE DRAWINGS

The invention will in the following be more closely described by means of embodiment examples, with reference to the appended drawings, where.

MODE(S) FOR CARRYING OUT THE INVENTION

An inventive monitoring method and monitoring arrangement will in the following be described as implemented to monitor the functioning of an exhaust gas aftertreatment system comprising a catalyst or the functioning of a temperature sensor or $NO_x$ sensor included in such a system. However, the invention is in no way limited to these utilizations. On the contrary, the invention may be utilized for monitoring an exhaust gas aftertreatment system having any type of exhaust gas aftertreatment appliance that has an effect on the magnitude of an exhaust gas parameter, which can be measured by a sensor and simultaneously calculated on the basis of a calculation model. The invention may e.g. be used for monitoring the functioning of an exhaust gas aftertreatment system comprising an exhaust gas aftertreatment appliance in the form of a filter, such as a particle filter or an open structure filter, or the functioning of a temperature sensor included in such an exhaust gas aftertreatment system.

Figure 1:
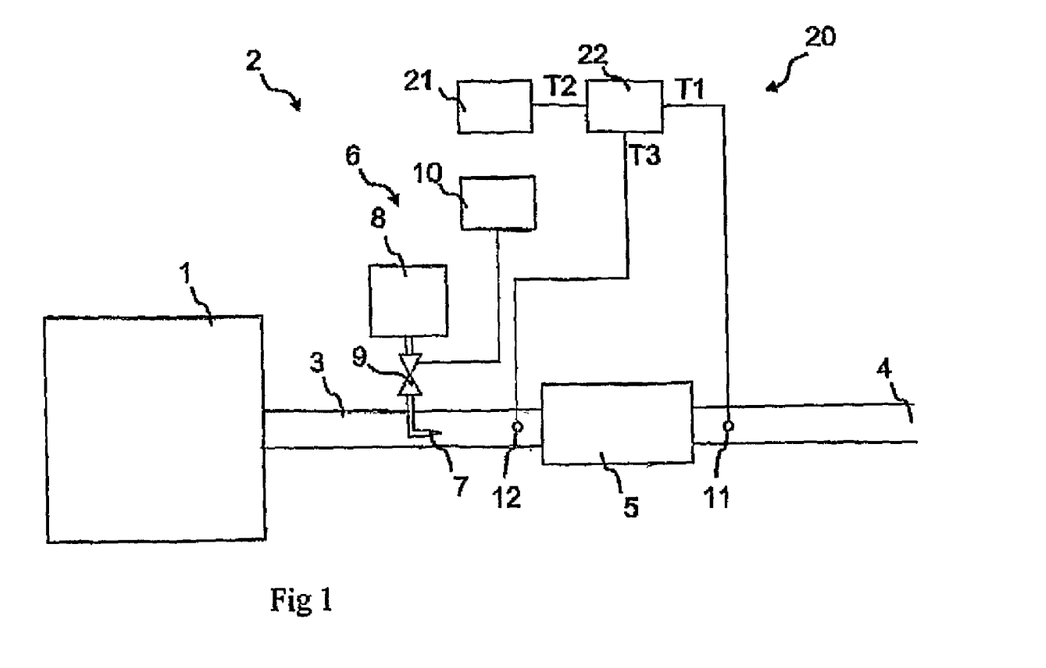
FIG. 1 is a schematic diagram of a combustion engine with an associated exhaust gas aftertreatment system, illustrating an embodiment of a monitoring arrangement according to the present invention.

A combustion engine 1 with an associated exhaust gas aftertreatment system 2 is schematically shown in FIG. 1. The exhaust gases leaving the combustion engine 1 are conveyed through an exhaust line 3 and are discharged into the surroundings via an exhaust outlet 4. A catalyst 5 is arranged in the exhaust line 3. The exhaust gases from the combustion engine 1 will pass the catalyst 5 before being discharged into the surroundings via the exhaust outlet 4.

In the example illustrated in FIG. 1, the catalyst 5 is an SCR catalyst. In this case, reducing agent is injected by means of an injection device 6 into the exhaust gases in the exhaust line 3 upstream of the catalyst 5. The injection device 6 comprises one or several injection members 7 in the form of injection nozzles or the like arranged in the exhaust line 3, and a reducing agent storage container 8 connected thereto. The injection device 6 also comprises a regulating member 9, e.g. in the form of a control valve, arranged to regulate the supply of reducing agent to said one or several injection members 7, and a control means 10 connected to the regulating member 9. The regulating member 9 is controlled by said control means 10, which determines, on the basis of the prevailing operating conditions of the combustion engine 1 and the catalyst 5, the amount of reducing agent to be injected into the exhaust gases. The injection device 6 may also comprise further components, such as a dosing appliance etc. The reducing agent may be urea ($CO(NH_2)_2$), ammonia ($NH_3$) or hydrocarbon (fuel).

A sensor 11 is arranged in the exhaust line 3 downstream of the catalyst 5. In this example, the sensor 11 is a temperature sensor arranged to generate a temperature value T1, here denominated first temperature value, representing the temperature of the exhaust gases flowing out of the catalyst 5, i.e. the exhaust gas temperature at the outlet of the catalyst.

Another temperature sensor 12 is arranged in the exhaust line 3 upstream of the catalyst 5. This temperature sensor 12 is arranged to generate a temperature value T3, here denominated third temperature value, representing the temperature of the exhaust gases upstream of the catalyst 5. This temperature sensor 12 may be arranged downstream of said one or several injection members 7, as illustrated in FIG. 1, or alternatively upstream of said one or several injection members 7.

The monitoring arrangement 20 comprises calculation means 21 adapted to calculate a temperature value T2, here denominated second temperature value, representing the temperature of the exhaust gases flowing out of the catalyst 5. Thus, the second temperature value T2 constitutes a theoretically established value of the exhaust gas temperature at the outlet of the catalyst 5. The calculation means 21 is adapted to calculate the second temperature value T2 by means of a suitable calculation model. The calculation model may be designed in any desired manner and use any desired input parameters as long as it provides, with a desired accuracy, a correct value of the expected exhaust gas temperature at the outlet of the catalyst 5. The calculation model may e.g. have the form described in closer detail in WO 2004/109072 A1 but may with advantage have a more simple structure than the calculation model described therein.

The monitoring arrangement 20 further comprises processing means 22 arranged to receive information from the sensor 11 as to the measured magnitude of the exhaust gas temperature downstream of the catalyst 5, i.e. information as to the above-indicated first temperature value T1. The processing means 22 is also arranged to receive information from the calculation means 21 as to the calculated magnitude of said temperature, i.e. information as to the above-indicated second temperature value T2.

The processing means 22 is adapted:
a) to establish a first comparison value C1 based on the information from the sensor 11 as to the measured first temperature value T1;
b) to establishing a second comparison value C2 corresponding to the first comparison value C1 based on the information from the calculation means 21 as to the calculated second temperature value T2;
c) to establish a difference value $V_{diff}$ representing the difference between said comparison values C1, C2;
d) to repeat the above-indicated measures a)-c) during a certain period of time and establish a variance value $V_{var}$ representing the variance of the difference value $V_{diff}$ during this period of time; and
e) to compare the variance value $V_{var}$ with a given threshold value $V_{th}$ for generation of information regarding the functioning of the exhaust gas aftertreatment system 2 or the sensor 11.

In the above-indicated example, the first comparison value C1 is suitably established so as to correspond directly with the first temperature value T1, in which case the second comparison value C2 is established so as to correspond directly with the second temperature value T2. Thus, the first temperature value T1 is in the last-mentioned case used as the first comparison value C1, whereas the second temperature value T2 is used as the second comparison value C2. However, an algorithm of any desired and suitable form may, if so considered appropriate, be used for transforming the first and second temperature values T1, T2 into the first comparison value C1 and the second comparison value C2, respectively. The above-mentioned period of time may in the given example e.g. be in the order of 5-30 minutes. During this period of time, test samples, each of which including a pair of comparison values C1 and C2, are taken repeatedly, e.g. with an interval in the order of 10-100 ms. The length of said period of time and the interval between each test sample may of course vary widely from case to case depending on the nature of the system or the sensor to be monitored.

The difference value $V_{diff}$ is suitably calculated as the difference $V_{diff}=C1-C2$ or the difference $V_{diff}=C2-C1$.

The variance is a calculated measure indicating how much a number of sample values deviates from the average of these sample values. The variance value $V_{var}$ may e.g. be calculated by the following formula:

$$V_{var} = \frac{1}{n-1} \sum_{i=1}^{n} (x_i - x_{av})^2$$

where $x_i$ is the difference value $V_{diff}$ number i, $x_{av}$ is the average of the evaluated difference values $V_{diff}$ and n is the number of evaluated difference values $V_{diff}$.

A suitable threshold value $V_{th}$ may be established empirically by practical tests and/or theoretically on the basis of suitable calculations.

The processing means 22 is suitably adapted to generate a fault indication if the variance value $V_{var}$ exceeds the threshold value $V_{th}$ so as to thereby indicate a functional disorder of the exhaust gas aftertreatment system 2 or the sensor 11. The monitoring arrangement 20 suitably comprises some sort of alarm device for emitting a warning signal when a fault of the monitored sensor or system has been detected.

A variance value $V_{var}$ exceeding the threshold value $V_{th}$ indicates that the catalyst 5 and/or any other component of the exhaust gas aftertreatment system 2, such as e.g. the injection device 6 or the sensor 11, is not functioning satisfyingly, and may e.g. be due to one or more of the following causes:
- the catalyst 5 or a part thereof has been removed,
- the catalyst 5 is degenerated or damaged,
- the sensor 11 is disconnected or damaged,
- the injection device 6 does not inject the expected amount of the expected reducing agent,
- an error in the calculation model,
- one or more of the input signals to the calculation model is incorrect.

Thus, the possible fault causes should be checked when a fault indication has been generated in order to find and correct the fault in question.

The inventive solution is very favourable for detecting whether or not an exhaust gas aftertreatment appliance, such as a catalyst or a filter, or a part thereof has been removed from an exhaust gas aftertreatment system. The monitoring according to the invention is not affected by any offset error of the sensor 11 or the calculation model. Thus, with the inventive solution, this type of fault detection can be carried out without sensitivity to such offset errors.

Figure 2A:
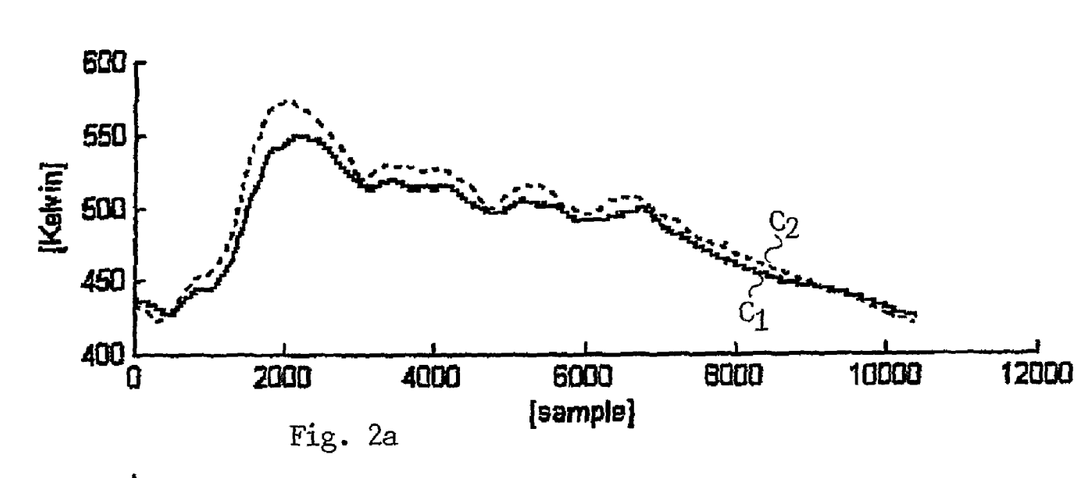
FIGS. 2a and 2b are diagrams showing comparison values recorded in an exhaust gas aftertreatment system based on the exhaust gas temperature downstream of a catalyst included in said system, and corresponding difference values and variance values calculated based on the comparison values.
Figure 2B:
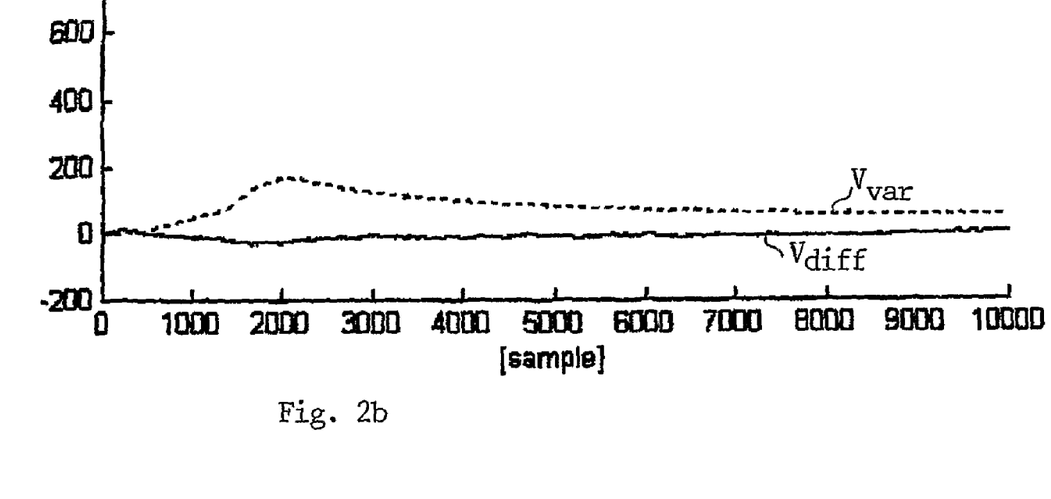
Figure 3A:
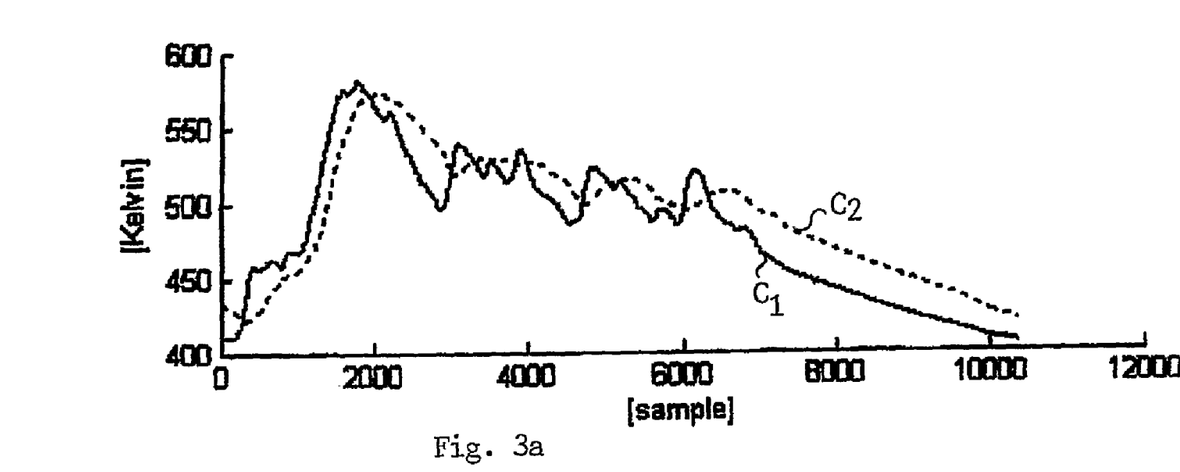
FIGS. 3a and 3b are diagrams corresponding to the diagrams of FIG. 2a and FIG. 2b, respectively, but with the catalyst removed from the exhaust gas aftertreatment system.
Figure 3B:
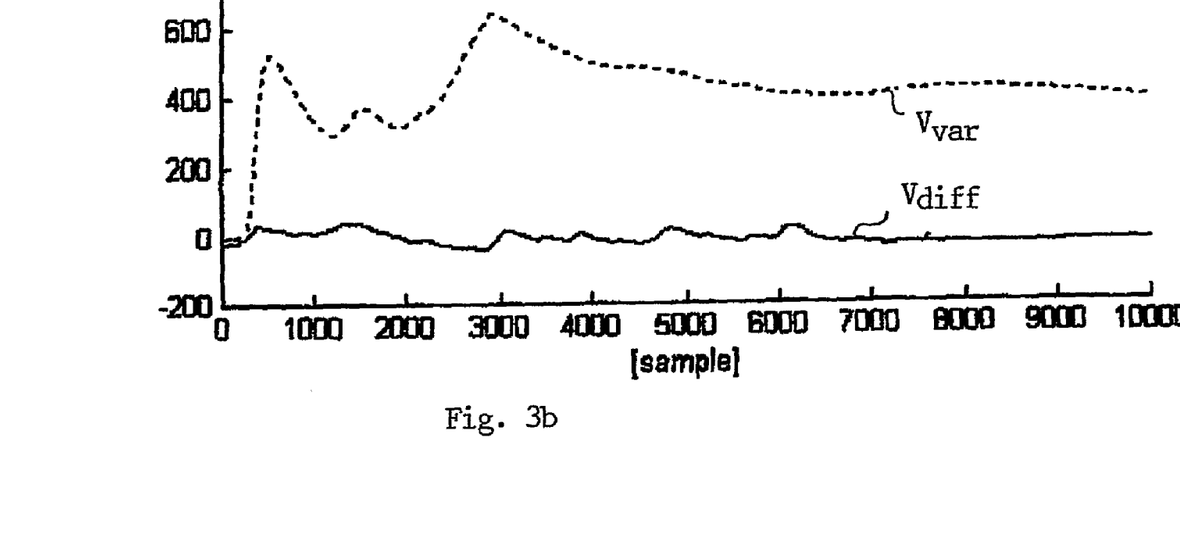

Curves representing a large number of samples of comparison values C1, C2 recorded in an exhaust gas aftertreatment system of the type illustrated in FIG. 1 during a test period are illustrated in FIGS. 2a and 3a. In this case, the first comparison value C1 corresponds to the above-indicated first temperature value T1 and the second comparison value C2 corresponds to the above-indicated second temperature value T2. Curves representing the difference values $V_{diff}$ and the variance value $V_{var}$ established based on the comparison values C1, C2 of FIG. 2a are illustrated in FIG. 2b and curves representing the difference values $V_{diff}$ and the variance value $V_{var}$ established based on the comparison values C1, C2 of FIG. 3a are illustrated in FIG. 3b. In the example illustrated in FIGS. 2a and 2b, the catalyst 5 is in place and functioning properly. In the example illustrated in FIGS. 3a and 3b, the catalyst 5 has been removed. It appears from FIGS. 2b and 3b that the variance value $V_{var}$ at the end of the test period is much higher with the catalyst removed then with the catalyst in place. Thus, the variance value $V_{var}$ may be used for detecting that the catalyst or a part thereof has been removed from an exhaust gas aftertreatment system.

If the combustion engine 1 is running under steady-state conditions during a test period with only very small changes in the temperature of the exhaust gases leaving the combustion engine 1, there is a risk that the variance value $V_{var}$ will remain below the threshold value $V_{th}$ even if the catalyst 5 has been removed or any other fault exists in the exhaust gas aftertreatment system. In order to avoid the generation of incorrect information as to the functioning of the system, the variance of the exhaust gas temperature upstream of the catalyst 5 could be taken into account by the monitoring arrangement 20. In the last-mentioned case, the processing means 22 is arranged to receive information from the temperature sensor 12 as to the measured magnitude of the temperature of the exhaust gases upstream of the catalyst, i.e. information as to the above-indicated third temperature value T3. The processing means 22 is adapted to establish a variance value $V_{var2}$, here denominated second variance value, representing the variance of this temperature T3 during the above-indicated period of time and to refrain from generating or reject any generated information regarding the functioning of the system 2 or the sensor 11 if the second variance value $V_{var2}$ is below a given threshold value $V_{th2}$. Hereby, valid information regarding the functioning of the system 2 or the sensor 11 will only be generated on condition that the exhaust gas temperature upstream of the catalyst 5 varies to a sufficient extent during the test period.

The calculation means 21 and the processing means 22 are with advantage included in one and the same computer unit, e.g. in the form of an electronic control unit of a motor vehicle, but may also be arranged in separate and mutually communicating computer units.

It should be evident to a person skilled in the art that the embodiment example described above in connection with the monitoring of an exhaust gas aftertreatment system provided with an exhaust gas aftertreatment appliance in the form of an SCR catalyst easily could be modified in order to monitor the functioning of an exhaust gas aftertreatment system provided with any other type of exhaust gas aftertreatment appliance having a calculable temperature inertness, such as another type of catalyst or a filter, or modified in order to monitor the functioning of another type of sensor than a temperature sensor. The parameter could for instance be the $NO_x$ content of the exhaust gases flowing out of a catalyst, in which case the above-indicated sensor 11 is a $NO_x$ sensor arranged downstream of the catalyst. The inventive solution does not make it possible to detect a constant offset error of a sensor, but will make it possible to detect e.g. that a sensor has been disconnected or damaged.

Figure 5:
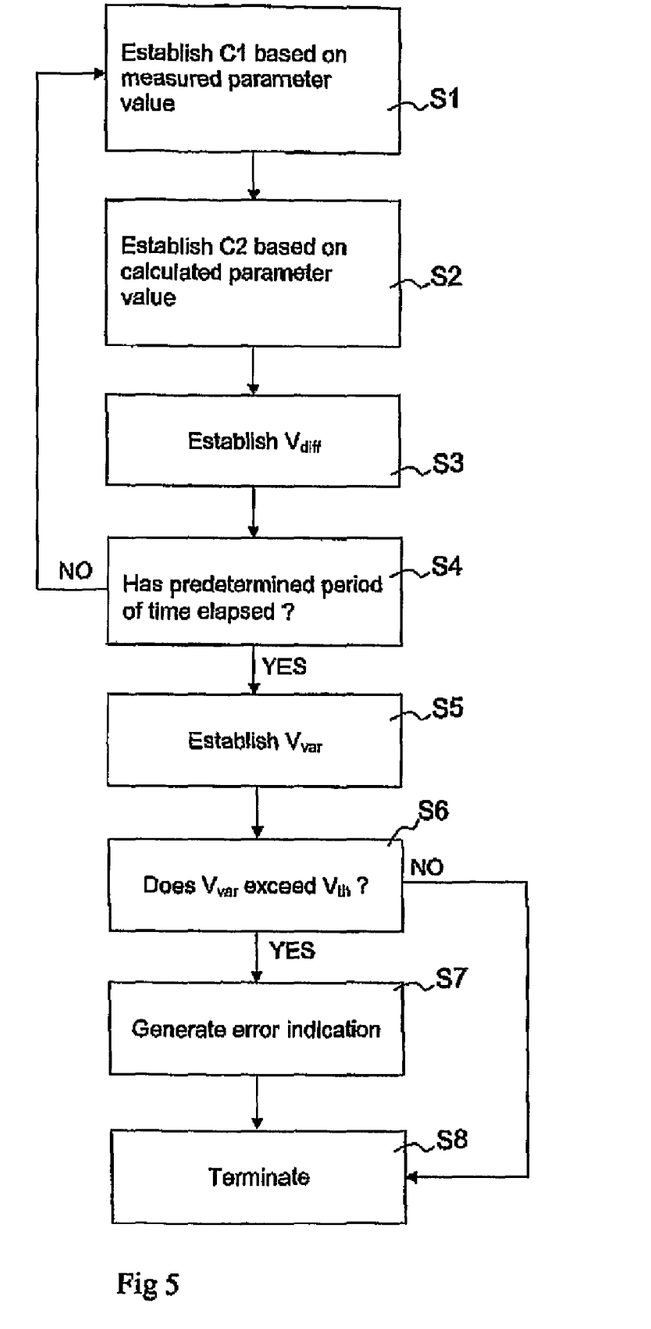
FIG. 5 is a flow diagram illustrating a method according to a first embodiment of the invention.

A flow diagram illustrating a method according to a first embodiment of the invention is shown in FIG. 5. In a first step S1, a first comparison value C1 is established based on a measuring value from a sensor as to the prevailing magnitude of a parameter. In a second step S2, a second comparison value C2 corresponding to the first comparison value C1 is established based on a value of the prevailing magnitude of said parameter calculated by means of a calculation model. A difference value $V_{diff}$ representing the difference between said comparison values C1, C2 is then established in a subsequent step S3, whereupon steps S1-S3 are repeated during a predetermined period of time. If it is established in step S4 that the predetermined period of time has elapsed, a variance value $V_{var}$ representing the variance of the difference value $V_{diff}$ during said period of time is established in step S5. Alternatively, the variance may be calculated during the recording of the test samples and repeatedly updated for each new test sample. In a subsequent step S6, said variance value $V_{var}$ is compared with a given threshold value $V_{th}$. If the comparison in step S6 indicates that the variance value $V_{var}$ exceeds the threshold value $V_{th}$, a fault indication is generated in step S7 so as to indicate a functional disorder of the sensor or a system associated therewith, whereupon the monitoring cycle is terminated in step S8. If the comparison in step S6 indicates that the variance value $V_{var}$ does not exceed the threshold value $V_{th}$, no fault indication is generated and the monitoring cycle is terminated in step S8.

Figure 6:
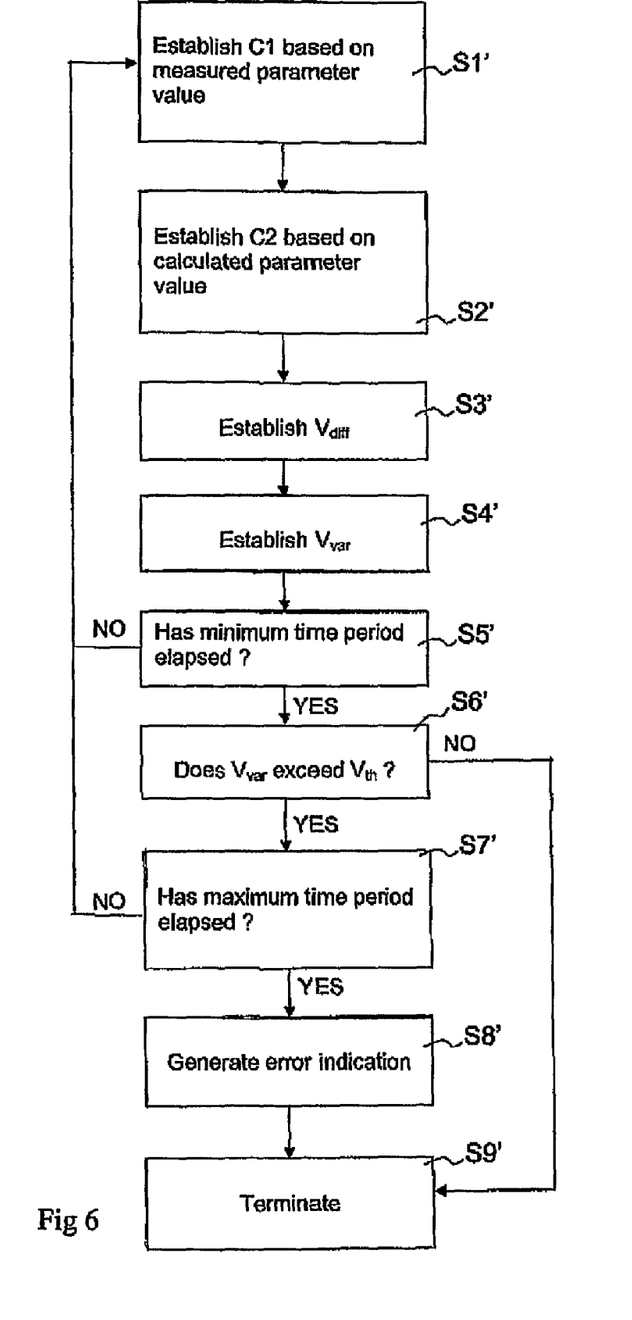
FIG. 6 is a flow diagram illustrating a method according to a second embodiment of the invention.

A flow diagram illustrating a method according to a second embodiment of the invention is shown in FIG. 6. Steps S1'-S3' correspond to the above-indicated steps S1-S3. In this case, the variance value $V_{var}$ is calculated in step S4' and repeatedly updated for each new test sample. If it is established in step S5' that a given minimum time period has not elapsed since the initiation of the monitoring cycle, steps S1'-S4' are repeated. If it is established in step S5' that the minimum time period has elapsed, the prevailing variance value $V_{var}$ is compared with a given threshold value $V_{th}$ in step S6'. If the comparison in step S6' indicates that the variance value $V_{var}$ does not exceed the threshold value $V_{th}$, the monitored sensor or system is assumed to be properly functioning and the monitoring cycle is terminated in step S9'. If the comparison in step S6' indicates that the variance value $V_{var}$ exceeds the threshold value $V_{th}$ the monitoring cycle proceeds to step S7'. If it is established in step S7' that a given maximum time period has not elapsed since the initiation of the monitoring cycle, steps S1'-S6' are repeated. If it is established in step S7' that the maximum time period has elapsed, a fault indication is generated in step S8' so as to indicate a functional disorder of the monitored sensor or system, whereupon the monitoring cycle is terminated in step S9'

Computer program code for implementing a method according to the invention is suitably included in a computer program, which is loadable into the internal memory of a computer, such as the internal memory of an electronic control unit of a motor vehicle comprising a system or a sensor to be monitored. Such a computer program is suitably provided via a computer program product comprising a data storage medium readable by an electronic control unit, which data storage medium has the computer program stored thereon. Said data storage medium is for instance an optical data storage medium in the form of a CD-ROM disc, a DVD disc etc, a magnetic data storage medium in the form of a hard disc, a diskette, a cassette tape etc, or a memory of the type ROM, PROM, EPROM or EEPROM or a Flash memory.

A computer program according to an embodiment of the invention comprises computer program code for causing a computer:
a) to receive information from a sensor as to the magnitude of a parameter related to exhaust gases flowing out of an exhaust gas aftertreatment appliance included in an exhaust gas aftertreatment system of a motor vehicle, and establish a first comparison value C1 based on said information;
b) to calculate, on the basis of a calculation model, a value representing the magnitude of said parameter or receive information about said value calculated on the basis of a calculation model, and establish a second comparison value C2 corresponding to the first comparison value C1 based on this calculated value;
c) to establish a difference value $V_{diff}$ representing the difference between said comparison values C1, C2;
d) to repeat steps a)-c) during a certain period of time and establish a variance value $V_{var}$ representing the variance of the difference value $V_{diff}$ during this period of time; and
e) to compare the variance value $V_{var}$ with a given threshold value $V_{th}$ for generation of information regarding the functioning of the sensor or the exhaust gas aftertreatment system.

Figure 4:
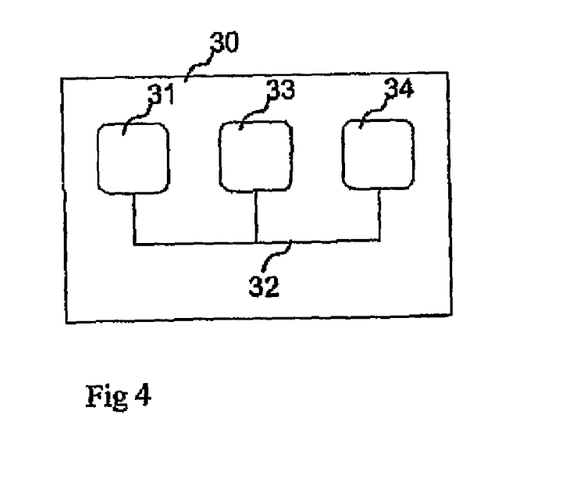
FIG. 4 is a schematic outline diagram of an electronic control unit for implementing a method according to the invention.

FIG. 4 very schematically illustrates an electronic control unit 30 comprising an execution means 31, such as a central processing unit (CPU), for executing computer software. The execution means 31 communicates with a memory 33, for instance of the type RAM, via a data bus 32. The control unit 30 also comprises data storage medium 34, for instance in the form of a memory of the type ROM, PROM, EPROM or EEPROM or a Flash memory. The execution means 31 communicates with the data storage medium 34 via the data bus 32. A computer program comprising computer program code for implementing a method according to the invention is stored on the data storage medium 34.

The invention is of course not in any way restricted to the embodiments described above. On the contrary, many possibilities to modifications thereof will be apparent to a person with ordinary skill in the art without departing from the basic idea of the invention as defined in the appended claims.

The invention claimed is:

1. A monitoring arrangement for monitoring the functioning of a sensor arranged to measure the magnitude of a parameter related to exhaust gases flowing out of an exhaust gas aftertreatment appliance, included in an exhaust gas aftertreatment system of a motor vehicle, wherein the monitoring arrangement comprises
    calculation apparatus operable for calculating the magnitude of said parameter on the basis of a calculation model; and
    processor arranged and operable to receive information from the sensor as to the measured magnitude of the parameter and information from the calculation apparatus as to the calculated magnitude of the parameter, the processor being operable
    a) to establish a first comparison value (C1) based on the information from the sensor as to the measured magnitude of the parameter,
    b) to establish a second comparison value (C2) corresponding to the first comparison value (C1) based on the information from the calculation apparatus as to the calculated magnitude of the parameter,
    c) to establish a difference value ($V_{diff}$) representing the difference between said comparison values (C1, C2), d) to repeat steps a)-c) during a period of time and establish a variance value ($V_{var}$) representing the variance of the difference value ($V_{diff}$) during this period of time, and e) to compare the variance value ($V_{var}$) with a given threshold value ($V_{th}$) and generate information regarding the functioning of the sensor.

2. A monitoring arrangement according to claim 1, wherein the processor is operable to generate a fault indication if the variance value ($V_{var}$) exceeds the threshold value ($V_{th}$) to thereby indicate a functional disorder of the sensor.

3. A monitoring arrangement according to claim 1 wherein the parameter is the temperature (T1) of exhaust gases flowing out of the exhaust gas aftertreatment appliance, and the sensor is a temperature sensor arranged and operable to measure said temperature (T1) and the calculation apparatus is operable to calculate the magnitude of said temperature on the basis of the calculation model.

4. A monitoring arrangement according to claim 1 wherein the parameter is $NO_x$ content of exhaust gases flowing out of an exhaust gas aftertreatment appliance in the form of a catalyst included in the exhaust gas aftertreatment system, the sensor is a $NO_x$ sensor arranged and operable to measure said $NO_x$ content and the calculation apparatus is operable to calculate the magnitude of said $NO_x$ content on the basis of the calculation model.

5. A monitoring arrangement for monitoring the functioning of an exhaust gas aftertreatment system of a motor vehicle based on measuring values from a sensor as to the magnitude of a parameter related to exhaust gases flowing out of an exhaust gas aftertreatment appliance included in the exhaust gas aftertreatment system, wherein:

the monitoring arrangement comprises calculation apparatus for calculating the magnitude of said parameter on the basis of a calculation model; and a processor arranged and operable to receive information from the sensor as to the measured magnitude of the parameter and information from the calculation apparatus as to the calculated magnitude of the parameter, the processor being operable:

a) to establish a first comparison value (C1) based on the information from the sensor as to the measured magnitude of the parameter, b) to establish a second comparison value (C2) corresponding to the first comparison value (C1) based on the information from the calculation apparatus as to the calculated magnitude of the parameter, c) to establish a difference value ($V_{diff}$) representing the difference between said comparison values (C1, C2), d) to repeat steps a)-c) during a period of time and establish a variance value ($V_{var}$) representing the variance of the difference value ($V_{diff}$) during this period of time, and e) to compare the variance value ($V_{var}$) with a given threshold value ($V_{th}$) and generate information regarding the functioning of the exhaust gas aftertreatment system.

6. A monitoring arrangement according to claim 5, wherein the processor is operable to generate a fault indication if the variance value ($V_{var}$) exceeds the threshold value ($V_{th}$) so as to thereby indicate a functional disorder of the system.

7. A monitoring arrangement according to claim 5 wherein the parameter is the temperature (T1) of exhaust gases flowing out of the exhaust gas aftertreatment appliance, and the sensor is a temperature sensor arranged and operable to measure said temperature (T1) and the calculation apparatus is operable to calculate the magnitude of said temperature on the basis of the calculation model.

8. A monitoring arrangement according to claim 7, further comprising:

the processor is arranged and operable to receive information from another temperature sensor as to the measured magnitude of a temperature (T3) of the exhaust gases upstream of the exhaust gas aftertreatment appliance and the processor is operable to establish a second variance value ($V_{var2}$) representing the variance of the temperature (T3) during said period of time; and the processor is operable to refrain from generating or rejecting any generated information regarding the functioning of the system if the second variance value ($V_{var2}$) is below a given threshold value ($V_{th2}$).

9. A monitoring arrangement according to claim 5 wherein the parameter is $NO_x$ content of exhaust gases flowing out of an exhaust gas aftertreatment appliance in the form of a catalyst included in the exhaust gas aftertreatment system, and the sensor is a $NO_x$ sensor arranged and operable to measure said $NO_x$ content and the calculation means (21) is adapted to calculate the magnitude of said $NO_x$ content on the basis of the calculation model.

10. A computer program loadable into the internal memory of a computer in a motor vehicle wherein the vehicle comprises an exhaust gas aftertreatment system and a sensor for measuring the magnitude of a parameter related to exhaust gases flowing out of an exhaust gas aftertreatment appliance included in the exhaust gas aftertreatment system, the computer program comprising computer program code for causing the computer:

a) to receive information from said sensor as to the measured magnitude of said parameter and establish a first comparison value (C1) based on said information;

b) to calculate, on the basis of a calculation model, a value representing the magnitude of said parameter or receive information about said value calculated on the basis of a calculation model, and to establish a second comparison value (C2) corresponding to the first comparison value (C1) based on this calculated value;

c) to establish a difference value ($V_{diff}$) representing the difference between said comparison values (C1, C2);

d) to repeat steps a)-c) during a period of time and establish a variance value ($V_{var}$) representing the variance of a difference value ($V_{diff}$) during this period of time; and e) to compare the variance value ($V_{var}$) with a given threshold value ($V_{th}$) and generating information regarding the functioning of the sensor or the exhaust gas aftertreatment system.

11. A computer program according to claim 10, wherein the computer program comprises computer program code for causing the computer to generate a fault indication if the variance value ($V_{var}$) exceeds the threshold value ($V_{th}$) so as to thereby indicate a functional disorder of the sensor or the exhaust gas aftertreatment system.

12. A computer program product comprising a data storage medium readable by an electronic control unit, a computer program according to claim 10 stored on said data storage medium.

13. An electronic control unit comprising an execution further comprising, a memory connected to the execution apparatus and a data storage medium connected to the execution apparatus, wherein a computer program according to claim 10 is stored on said data storage medium.

14. A method for monitoring the functioning of a sensor arranged to measure the magnitude of a parameter related to exhaust gases flowing out of an exhaust gas aftertreatment appliance included in an exhaust gas aftertreatment system of a motor vehicle, the method comprising the steps of:
- a) establishing a first comparison value (C1) based on a measuring value from the sensor as to the magnitude of said parameter;
- b) establishing a second comparison value (C2) corresponding to the first comparison value (C1) based on a value of the magnitude of said parameter calculated by means of a calculation model;
- c) establishing a difference value ($V_{diff}$) representing the difference between said comparison values (C1, C2);
- d) repeating steps a)-c) during a period of time and establishing a variance value ($V_{var}$) representing the variance of the difference value ($V_{diff}$) during the period of time; and
- e) comparing the variance value ($V_{var}$) with a given threshold value ($V_{th}$) for causing generation of information regarding the functioning of the sensor (11).

15. A method according to claim 14, further comprising generating a fault indication if the variance value ($V_{var}$) exceeds the threshold value ($V_{th}$) to thereby indicate a functional disorder of the sensor.

16. A method according to claim 14, wherein said sensor is a temperature sensor arranged to measure the temperature (T1) of exhaust gases flowing out of the exhaust gas aftertreatment appliance, the method comprising establishing the first comparison value based on a measuring value from the temperature sensor as to the magnitude of said temperature, and establishing the second comparison value (C2) based on a value of the magnitude of said temperature calculated by means of a calculation model.

17. A method according to claim 14, wherein said exhaust gas aftertreatment appliance is a catalyst, and said sensor is a $NO_x$ sensor arranged to measure the $NO_x$ content of exhaust gases flowing out of the catalyst, the method comprising establishing the first comparison value (C1) based on a measuring value from the $NO_x$ sensor as to the magnitude of said $NO_x$ content, and establishing the second comparison value (C2) based on a value of the magnitude of said $NO_x$ content calculated by means of a calculation model.

18. A method for monitoring the functioning of an exhaust gas aftertreatment system of a motor vehicle based on measuring values from a sensor as to the magnitude of a parameter related to exhaust gases flowing out of an exhaust gas aftertreatment appliance included in the exhaust gas aftertreatment system, the method comprising the steps of:
- a) establishing a first comparison value (C1) based on a measuring value from the sensor as to the magnitude of said parameter;
- b) establishing a second comparison value (C2) corresponding to the first comparison value (C1) based on a value of the magnitude of said parameter calculated by means of a calculation model;
- c) establishing a difference value ($V_{diff}$) representing the difference between said comparison values (C1, C2);
- d) repeating steps a)-c) during a period of time and establishing a variance value ($V_{var}$) representing the variance of the difference value ($V_{diff}$) during the period of time; and
- e) comparing the variance value ($V_{var}$) with a given threshold value ($V_{th}$) for causing generation of information regarding the functioning of the exhaust gas aftertreatment system.

19. A method according to claim 18, further comprising generating a fault indication if the variance value ($V_{var}$) exceeds the threshold value ($V_{th}$) to thereby indicate a functional disorder of the exhaust gas aftertreatment system (2).

20. A method according to claim 18, wherein said sensor is a temperature sensor arranged to measure the temperature (T1) of exhaust gases flowing out of the exhaust gas aftertreatment appliance (5), the method further comprising establishing the first comparison value (C1) is based on a measuring value from the temperature sensor as to the magnitude of said temperature, and establishing the second comparison value (C2) based on a value of the magnitude of said temperature calculated by means of the calculation model.

21. A method according to claim 20, further comprising:
measuring temperature (T3) of the exhaust gases upstream of the exhaust gas aftertreatment appliance and establishing a second variance value ($V_{var2}$) representing variance of the temperature (T3) during said period of time; and
rejecting or not generating information regarding the functioning of the exhaust gas aftertreatment system if the second variance value ($V_{var2}$) is below a given threshold value ($V_{th2}$).

22. A method according to claim 18, wherein said exhaust gas aftertreatment appliance is a catalyst and said sensor is a $NO_x$ sensor arranged and operable to measure $NO_x$ content of exhaust gases flowing out of the catalyst,
the method further comprising establishing the first comparison value (C1) based on a measuring value from the $NO_x$ sensor as to the magnitude of $NO_x$ content, and establishing the second comparison value (C2) based on a value of the magnitude of said $NO_x$ content calculated by the calculation model.

* * * * *